Figure 7:
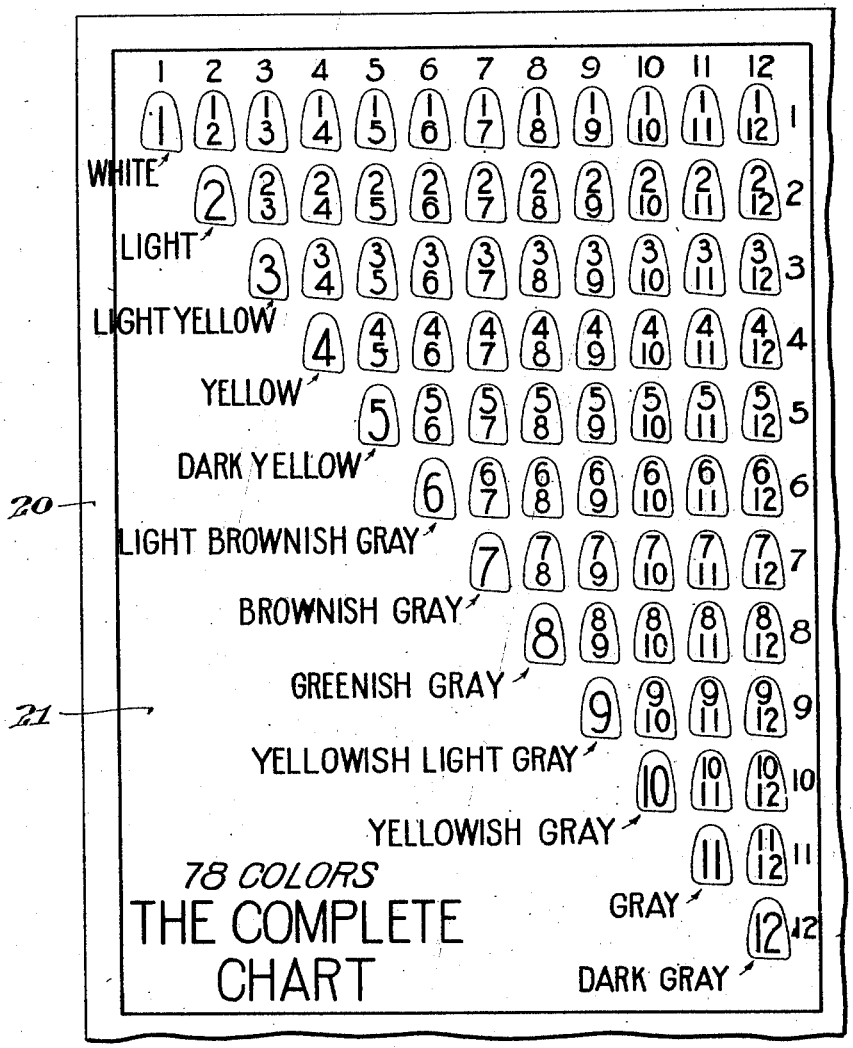

April 16, 1929.　　　F. H. FIELD　　　1,709,066
TOOTH SHADE GUIDE
Filed May 21, 1923　　　3 Sheets-Sheet 1
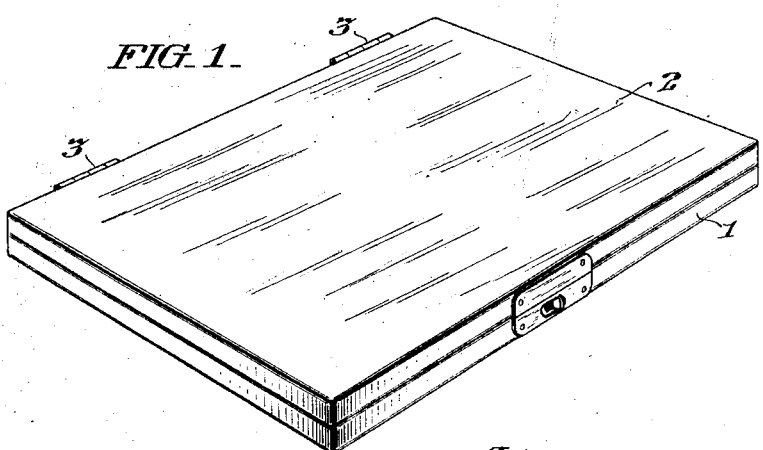
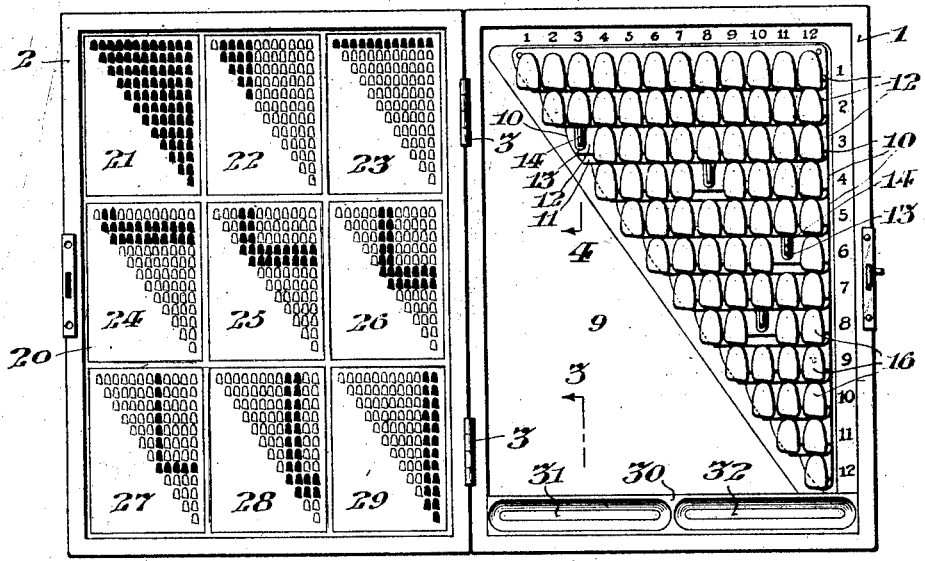
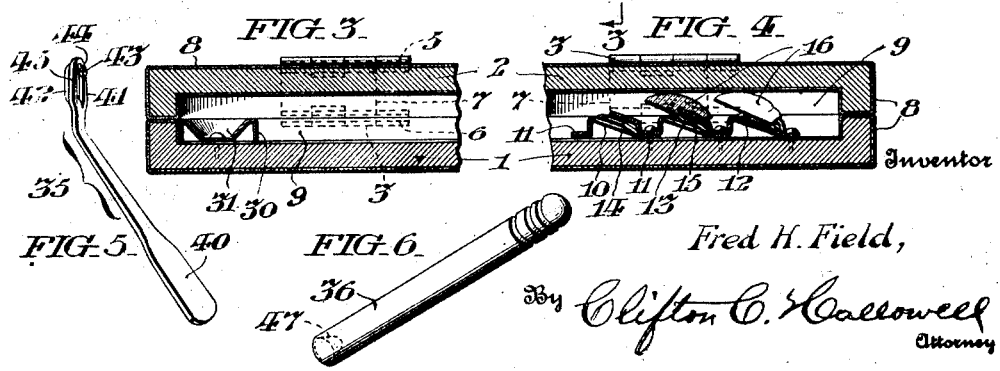
Fred H. Field,
By Clifton C. Hallowell
Attorney April 16, 1929.  F. H. FIELD  1,709,066

TOOTH SHADE GUIDE

Filed May 21, 1923  3 Sheets-Sheet 2

Inventor
Fred H. Field,
By Clifton C. Caldwell
Attorney

Patented Apr. 16, 1929.

1,709,066

UNITED STATES PATENT OFFICE.

FRED H. FIELD, OF PHILADELPHIA, PENNSYLVANIA, ASSIGNOR TO THE S. S. WHITE DENTAL MANUFACTURING COMPANY, A CORPORATION OF PENNSYLVANIA.

TOOTH-SHADE GUIDE.

Application filed May 21, 1923. Serial No. 640,321.

My invention relates to the art of matching colors or shades of teeth in the human mouth, and is particularly directed to that class of devices by which comparison may be made with said teeth to determine the plastic tooth-filling materials best adapted to produce a composition having a color or shade most nearly simulating the color or shade of the tooth to be filled or otherwise treated.

The principal objects of my invention are to provide a tooth-shade guide comprising a shade-blending chart, having means by which the various plastic materials, or combinations thereof, may conveniently be selected to produce the desired color or shade.

Other objects of my invention are to provide a tooth-shade guide having samples each differing in colors or shades readily comparable with the natural teeth of the human mouth and so positioned thereon and identified as to indicate the color, or blend of colors, requisite to produce the desired shade that will best match the shade of the tooth with which it is to be associated.

Further objects of my invention are to provide a plurality of plastic compounds which will each by itself produce a basic color or shade differing one from the other and represented by the basic color samples disposed in a predetermined sequence on said shade blending chart, and which when blended by mixing one with another in equal proportions produce color shades represented by the other samples of said shade blending chart.

My invention comprehends such an arrangement of the samples on said chart as to readily indicate the particular plastic compound, or the combination of two of said plastic compounds in equal proportions, that will produce a plastic composition of the color or shade desired.

My invention further includes a tooth-shade blending chart comprising a plurality of color zones, which are so arranged as to intersect and blend with each other, and which serve to facilitate the selection of the samples on the chart.

Specifically stated, the form of my invention as hereinafter described comprises a tooth-shade guide in the form of a checker board chart, having samples removably mounted thereon in intersecting rows and columns, the transverse columns being consecutively numbered from left to right and the vertical rows being similarly numbered from top to bottom, said numbers corresponding to the similarly numbered containers of the different basic colored plastic materials or compounds, whereby any selected sample shade-tooth of the chart indicates by a glance at the indicating number or numbers of the intersecting rows and columns in which said sample is disposed, the particular number or numbers of the plastic compounds that may be employed in equal proportions to produce a composition having the color or shade of the sample selected.

My invention also includes all of the various novel features of construction and arrangement as hereinafter more definitely specified.

Figure 8:
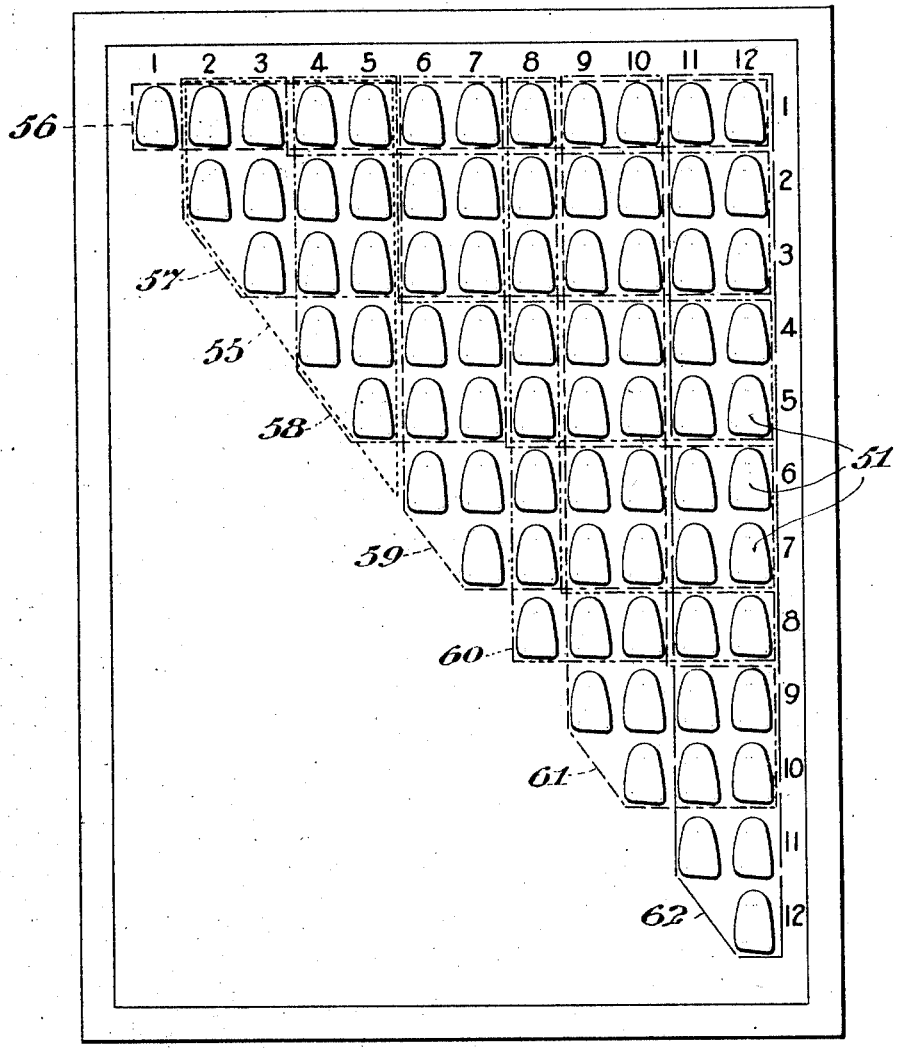

In the accompanying drawings Figure 1 is a perspective view of a casing in which the charts are conveniently enclosed; Fig. 2 is a plan view of said casing in opened position showing the body and lid extended in a plane; Fig. 3 is an enlarged fragmentary sectional view of the casing with its lid closed, taken on the line 3—3 in Fig. 2; Fig. 4 is a fragmentary sectional view similar to Fig. 3 taken on the line 4—4 in Fig. 2; Fig. 5 is a perspective view of the sample shade-tooth holder; Fig. 6 is a perspective view of the carrier by which the cement materials are measured and carried to the mixing slab; Fig. 7 is a fragmentary plan view showing one unit of the composite chart shown in the lid at the left-hand side of Fig. 2 and particularly illustrating the chart shown at the upper left-hand corner on an enlarged scale, and Fig. 8 is a plan view of a modified form of chart wherein the color combinations are embodied in a single unit, and divided into color zones.

In said figures, the body 1 of the casing has the lid 2 connected therewith by the hinges 3, which, as shown in Figs. 3 and 4, each comprise spaced parallel pintles 5 and 6 having the intermediate connecting web 7, whereby the lid 2 may, if desired, be folded back so that its outer surface may engage the outer surface of the body 1, and said body be supported thereon.

Both the body 1 and lid 2 of the casing may be covered with any suitable material such as leather 8 and when closed afford the inclosed space providing the chamber 9.

Within the chamber 9, the body 1 is provided with a plurality of shade-tooth racks 10 having flanges 11, by which they may be secured to the body 1, and providing the inclined panels 12, from which extend tooth-engaging clips each comprising the projections 13 and 14 punched or pressed from said inclined panels 12 and extended in a plane substantially parallel therewith, but tending to relatively incline in the direction of their free ends and to bear toward each other.

The projection forming the prong or tang 14 is extended outwardly and disposed beyond the plane of the tongue 13, being arranged to enter the recess 15 in the shade-tooth 16, as best shown in Fig. 4, and to force the lingual surface of said shade-tooth against the tongue 13, which by reason of the spring tension of said tongue conveniently conforms to and bears with substantial firmness against the back surface of the shade-tooth, yet permitting said shade-tooth to be readily withdrawn therefrom when it is desired to compare it with the natural teeth of the patient.

As shown in Fig. 2, the uppermost rack 10 is arranged to carry twelve shade-teeth, while the remaining racks carry teeth in decreased numbers, decreasing by one from the top downward, thus affording a triangular arrangement of the teeth on the chart, so that said teeth are disposed in transverse and vertical intersecting rows and columns, the transverse rows decreasing by one tooth from the top downward and the vertical columns decreasing by one from the right toward the left. Said vertical columns, as shown in said Fig. 2, are numbered at the top from 1 to 12, and the transverse rows are numbered at the right-hand side from the top downward from 1 to 12. Therefore, the shade-teeth disposed along the diagonal side or hypotenuse of said triangle and forming the lower ends of the vertical rows and left-hand end of the transverse rows of shade-teeth, will be disposed at the intersection of the vertical and transverse rows and columns bearing the same numeral or symbol or indicia of identification and may be similarly numbered if desired and constitute a major diagonal of the checkerboard. For, instance, the tooth at the left-hand end of the transverse row, bearing numeral 5, will likewise be disposed in the vertical column, bearing the numeral 5.

The shade-teeth numbered 1 to 12, forming the major diagonal or side of the chart, may be produced by cement materials, whose containers may bear similar identification symbols, and each is so compounded that it will by itself produce one of the twelve basic colored shade-teeth, and may be combined one with another to produce cement of the color or shade of the other shade-teeth of said chart.

To facilitate the selection of the shade-teeth which resemble the teeth of the patient to be matched, a supplemental composite chart 20 is provided, comprising a plurality of chart units each having sample teeth represented thereon and conveniently segregating the teeth into specific color zones. Chart unit 21 which, for convenience of illustration is shown enlarged in Fig. 7, embodies representations of the sample shade-teeth and inscribed on each, the number or combination of numbers of samples indicating the intersecting rows and columns of sample shade-teeth in which they are included. Chart unit 22 embodies representations of the sample shade-teeth, and shows in solid black those sample shade-teeth of the chart that are purely yellow or a shade of yellow. Chart unit 23 shows in solid black representations of those sample shade-teeth of the chart that are white or shades of white. Chart unit 24 similarly indicates those teeth that are light yellow or shades thereof. Chart unit 25 indicates teeth of a yellowish cast and corresponding shades, and likewise, chart units 26, 27, 28, and 29, respectively, designate the sample shade-teeth on the chart having brownish shades, greenish shades, yellowish gray shades, and what may be termed purely gray shades. The blank space of said charts toward their lower left hand corners conveniently provides for the inscription of descriptive notes that may be found desirable, such as shown in Fig. 7.

At the lowermost end of the chamber 9 in the casing body 1, a receptacle 30, preferably formed of sheet material is provided, which has the grooves or troughs 31 and 32 respectively arranged to receive, when not in use, the trial shade-tooth holder 35, shown in Fig. 5, and the cement material carrier 36, shown in Fig. 6.

The shade-tooth holder 35 comprises the handle 40 having its forward end extended obliquely to provide a seat 41 for the sample shade-teeth 16, and has the spring tang 42 punched outwardly from said seat and provided with the projection or pin 43 whose head 44 is extended through the opening 45, which is formed in said seat by punching the spring tang 42 therefrom. The sample shade-teeth may be removed from the rack, and engaged with said holder by entering the head 44 of the pin 43 into the slot or recess 15 in the back of said sample shade-teeth, whereby the back surface of said sample shade-teeth will engage said seat and be held in frictional contact therewith by the spring tang 42. It will be obvious that when a sample shade-tooth is engaged with this holder, that the operator may conveniently insert it into the patient's mouth for close comparison with the natural teeth of the patient.

The cement material carrier 36 comprises a cylindrical body having at one end a semi-ovate form of socket or recess 47 for the reception of cement material, which may be entered therein and measured thereby, upon the operator forcing the carrier axially into the bottle or container of the cement material and withdrawing it with the cement material compressed into said recess. Thus, the cement material may be carried thereby and deposited on a mixing slab in predetermined uniform quantities.

The modified form of chart shown in Fig. 8 embodies in a single chart unit the units of the composite chart shown in the lid in Fig. 2, and includes intersecting vertical and transverse columns and rows of tooth-shade indicating devices 51 included in color zones, each embracing selected rows and columns of said devices and intersecting each other to afford color combinations corresponding to the wide range of tooth colors or shades found in natural teeth. The purely yellow shades of said chart are included in the space bounded by the dotted line 55, the white shades are included in the space bounded by the dash line 56, the light yellow shades are included in the space bounded by the dot-and-dash line 57, the yellowish shades are included in the space bounded by the two-dot-and-dash line 58, the brownish-gray shades are included in the space bounded by the two-dash-and-dot line 59, the greenish-gray shades are included in the space bounded by the three-dot-and-dash line 60, the yellowish-gray shades are included in the space bounded by the three-dash-and-dot line 61, and the gray shades are included in the space bounded by the broken line 62.

Although I have shown the color zones as bounded by different forms of broken or interrupted lines, it will be obvious that the background may be actually colored in white, yellow, brown, green and gray, or otherwise indicated as desired.

The charts may be utilized by determining in a general way, through observation, the color of the natural tooth to be treated, which, if of a brownish cast, the operator refers first to chart 21 and ascertains that the basic brownish gray tooth is positioned at the intersection of the vertical column 7 and the horizontal row 7, then, by reference to chart 26, he finds that the basic color tooth 7 is included in the zone embracing the vertical lines 6 and 7, and the horizontal lines 6 and 7 of brownish-gray teeth, see Figs. 2 and 7; or to the space included in the color zone bounded by the two-dash-and-dot line 59 of the chart shown in Fig. 8. Having determined in a general way the position of the brownish-gray shades of the teeth on the racks 10 in the body 1 of the casing shown in Fig. 2, he may select therefrom a sample tooth for trial, which may be withdrawn from the sample shade-tooth rack and placed upon the trial shade-tooth holder 35, by which said shade-tooth may be conveniently held and inserted by the operator into the patient's mouth closely adjacent to the natural tooth to be treated. If this trial shade-tooth, thus selected, is found to be of a shade too light or too dark, he may determine therefrom a shade which will more nearly simulate the natural shade desired, and may repeat the operation until he finds the shade which is most suitable.

Having determined the shade desired, which for convenience may be the shade-tooth that is shown as having been removed from the 6th transverse row and the 11th vertical row of the rack in Fig. 2, he refers to the corresponding tooth on the chart 21 and finds it to be the tooth which bears the numerals 6 and 11, which indicates that by mixing the material in the container numbered 6 and the material in the container numbered 11 in equal proportions, a cement will be produced of the color of the tooth which is to be treated. Having thus determined the desired materials, he may employ the material carrier 36 to measure and carry the material to the mixing slab of any desired and well-known construction. This may be done by forcing said carrier with its open end downwardly into the cement material until said material is sufficiently compacted into the semi-ovate hollow or recess 47 thereof to insure its remaining there while being conveyed by said carrier to the mixing slab, not shown.

If, however, it be found that the tooth to be treated is of a color such as the tooth shown as removed from the rack in the vertical column 3 and transverse column 3, then the material contained in the container 3 will, by itself, produce a cement of the color desired, so that, as may be readily observed, the color or shade indicated by any one of the teeth disposed in the diagonal row of teeth at the left-hand end of the transverse rows may be produced by employing the corresponding numbered filling material by itself, and that the color or shade of any one of the other shade-teeth on the chart may be produced by a combination, in equal proportions, of two of the materials contained in the numbered containers, corresponding to the numbers of the intersecting transverse and vertical rows and columns in which the selected tooth of the chart may be disposed.

It will be obvious that the shade-tooth samples carried by the racks may themselves bear their identification symbols, and that they may be otherwise disposed and arranged. Therefore, it is not desired to limit my invention to the precise details of construction and arrangement as herein set forth, as it is obvious that various modifications may be made therein without departing from the essential features of my invention as defined in the appended claims.

Having thus described my invention, I claim:

1. A tooth-shade blending chart comprising intersecting rows and columns of tooth-shade indicating devices arranged in specifically defined color zones each embracing selected rows of said devices, said rows and columns intersecting each other to indicate color combinations corresponding to a wide range of tooth colors or shades found in natural teeth.

2. A tooth-shade blending chart comprising intersecting rows and columns of tooth-shade indicating devices, the respective rows and columns of said devices bearing identification symbols, and being arranged in color zones each embracing selected rows and columns of said devices, and intersecting each other to indicate color combinations corresponding to a wide range of tooth colors or shades found in natural teeth.

3. A tooth-shade blending chart comprising intersecting rows and columns of tooth-shade indicating devices, disposed in a triangular area, and being arranged in color zones each embracing selected rows of said devices, and intersecting each other to indicate color combinations corresponding to a wide range of tooth colors or shades found in natural teeth and identifying symbols for said rows and columns.

4. A tooth-shade blending chart comprising intersecting rows and columns of tooth-shade indicating devices, disposed in a triangular area, the rows and columns extending in one direction being consecutively numbered, and the intersecting rows and columns being similarly numbered, said devices being arranged in color zones each embracing selected rows and columns of said devices, and intersecting each other to indicate color combinations corresponding to a wide range of tooth colors or shades found in natural teeth.

5. A tooth-shade blending chart comprising intersecting rows and columns of tooth-shade indicating devices, disposed in an area forming a right-angled triangle, and arranged in color zones each embracing selected rows of said devices, and intersecting each other to indicate color combinations corresponding to a wide range of tooth colors or shades found in nature, the devices adjacent to the hypotenuse of said triangular area representing basic colors or shades, while the remaining devices within the triangular area represent combinations of said basic colors.

6. A dental cement selective device comprising a chart having a plurality of tooth-shade devices respectively embodying the different colors or shades found in natural teeth and disposed in intersecting rows in triangular formation, the devices forming the diagonal side or hypotenuse of said triangle, each embodying a definite basic color or shade and formed of a composition peculiar to its particular color or shade, the colors or shades of the other devices being produced by combinations of equal portions of the compositions corresponding to the devices in the diagonal side of said chart which lie in the intersecting rows of the selected device.

7. A tooth shade blending chart comprising intersecting rows and columns of tooth shade indicating devices disposed in a triangular area, identification symbols for the respective rows and columns, the devices being arranged in the rows and columns in transition from less intense to more intense shades of a given color, so that adjacent each device are located the other devices which most closely approximate its own color.

8. A tooth shade blending chart comprising intersecting rows and columns of tooth shade indicating devices arranged in area forming a right-angled triangle, the rows and columns representing successive transitions of color, similar colors being arranged adjacent each other in rows and columns, the devices adjacent to the hypotenuse of said triangular area representing basic colors or shades, while the remaining devices within the triangular area represent combinations of said basic colors.

9. A color device for determining the selection of two tooth cement materials of standard primary colors in equal proportions whereby to match a given tooth, comprising primary color specimens of the cement materials and secondary color specimens each representing a mixture of the cement materials in equal proportions arranged in vertical columns and transverse rows within a triangular area, the vertical columns and transverse rows intersecting in the hypotenuse of said triangular area, each of said intersecting rows and columns bearing respective indicia differing from that of each other row or column, and indicating the cement material of which a color specimen is located on the hypotenuse.

10. A chart of the class described and containing specimens of standard primary colors and of secondary colors produced by the mixture of equal proportions of said primary colors, said specimens being arranged in vertical columns and transverse rows in a triangular area, the primary color specimens being arranged on the hypotenuse of the triangular area, the secondary color specimens being arranged at the intersections of the vertical columns and transverse rows, and in such order that each column contains secondary specimens formed by the primary colors of the primary color specimens located therein in mixture with the primary color of the primary specimen contained in the row in which the secondary color specimen is located.

In witness whereof, I have hereunto set my hand this eighth day of May, A. D., 1922.

FRED H. FIELD.